United States Patent [19]
Brook, III

[11] Patent Number: 5,574,542
[45] Date of Patent: Nov. 12, 1996

[54] SCANNER COVER

[75] Inventor: Mark G. Brook, III, Londonberry, N.H.

[73] Assignee: AGFA Division, Bayer Corporation, Wilmington, Mass.

[21] Appl. No.: 601,205

[22] Filed: Feb. 14, 1996

[51] Int. Cl.$^6$ ............................ G03B 27/62; G03G 15/00
[52] U.S. Cl. ............................................. 399/380; 355/75
[58] Field of Search ................................. 355/230, 231, 355/75; 358/474; 382/312, 315

[56] References Cited

U.S. PATENT DOCUMENTS 4,595,285  6/1986  Miwa ........................................ 355/75
4,707,117  11/1987  Takenaka et al. .................. 355/230 X

FOREIGN PATENT DOCUMENTS 59-23338   2/1984  Japan ........................................ 355/75
63-298331  12/1988  Japan ........................................ 355/75

Primary Examiner—Arthur T. Grimley
Assistant Examiner—Sophia S. Chen
Attorney, Agent, or Firm—John A. Merecki

[57] ABSTRACT

A scanner cover including a rigid top cover component and a lower flexible cover component releasably mounted therebelow. The cover components may be coupled together for use as a single unit, or separately to allow for the placement, adjustment, viewing and/or removal of original(s) without disturbing other original(s) on the scanning surface.

2 Claims, 4 Drawing Sheets

5,574,542

SCANNER COVER

FIELD OF THE INVENTION

The present invention relates in general to scanning systems including a transparent scanning surface. More particularly, the present invention is directed to an improved cover for holding a document to be scanned, hereinafter referred to as an "original", flat against the transparent scanning surface of a scanning system.

BACKGROUND OF THE INVENTION

The functions of a scanner cover are first to hold a scanned document firmly in place during scanning, and second to provide an optically reflective background for the scanned material. It is often desirable to raise the cover partially to check and/or adjust the positioning of the document. In the prior art systems, however, raising and lowering a cover rigid enough to hold the material fiat can cause a position shift unless other methods are used for securing the document.

SUMMARY OF THE INVENTION

In order to overcome the deficiencies of the prior art, the present invention provides an improved cover for holding originals against the transparent scanning surface of a scanning system. Such scanning systems may include document screeners, electrophotographic copiers and the like.

A preferred embodiment of the present invention includes a rectangular cover which is hinged on one side to the top of a scanning system adjacent to a transparent scanning surface, thereby allowing the cover to be raised or lowered in its entirely relative to the transparent scanning surface. The cover further includes a rigid top cover component and a lower flexible cover component releasably mounted therebelow. The cover components may be coupled together for use as a single unit, or separately to allow for the placement, adjustment, viewing and/or removal of original(s) without disturbing other original(s) on the scanning surface.

BRIEF DESCRIPTION OF THE DRAWINGS

The features of the present invention will best be understood from a detailed description of the invention and a preferred embodiment thereof selected for the purposes of illustration mad shown in the accompanying drawings in which.

DETAILED DESCRIPTION OF THE INVENTION

Figure 1:
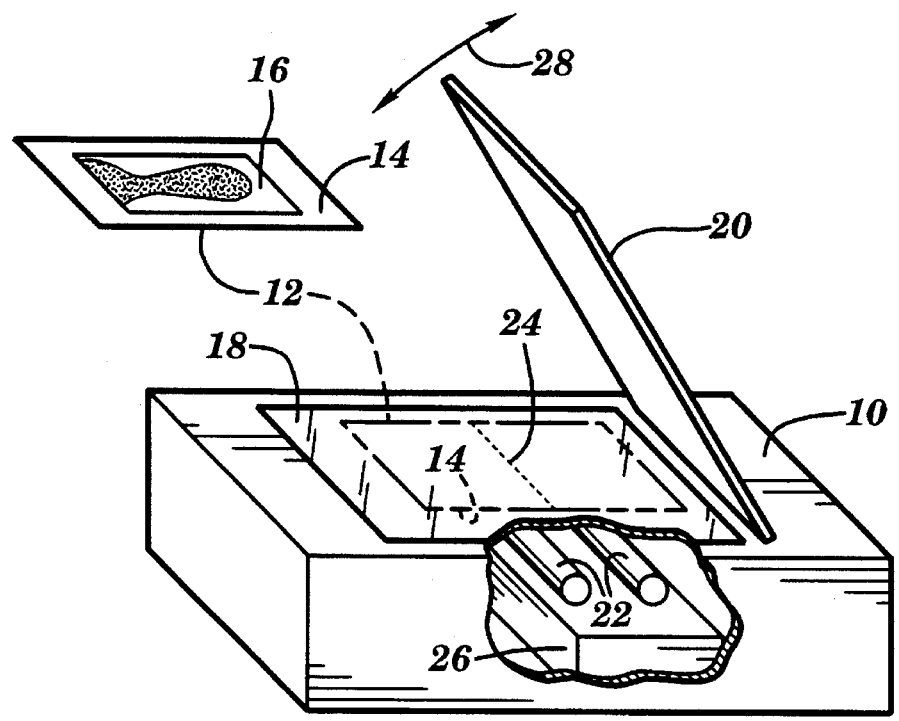
FIG. 1 illustrates a prior art scanning system including a conventional one-piece cover.

Referring now specifically to the accompanying drawings, there is illustrated a scanning system including an improved cover in accordance with the present invention, wherein like reference numerals refer to like elements throughout the drawings.

In FIG. 1, a prior art scanning system 10 is configured for the scanning of a reflective original 12. The reflective original 12 is placed with the surface 14 containing the image 16 to be scanned facing down on a transparent scanning surface 18, and held in place by a conventional, rigid, unitary scanner cover 20. The surface is illuminated from below by lamps 22, producing a scan line 24. The scanning optics and sensor electronics are located in a scan module 26, which is driven together with lamps 22 to move the scan line 24 across the length of the original 12, thereby scanning the original 12 to produce a digital representation thereof. The scanner cover 20 is pivotally secured on one side to the main body of the scanning system 10 via a hinge mechanism (not shown), thereby allowing the cover 20 to be raised and lowered in its entirety as indicated by directional arrow 28 to position one or more reflective originals 12 on the transparent scanning surface 18.

Figure 2:
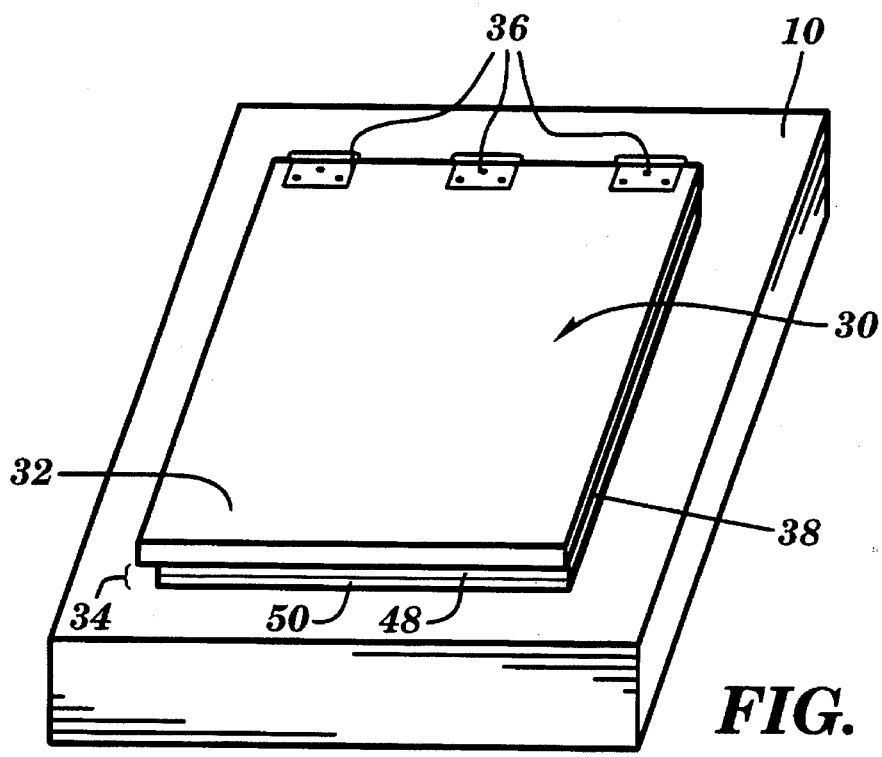
FIG. 2 shows the scanner cover of the present invention in closed position.
Figure 3:
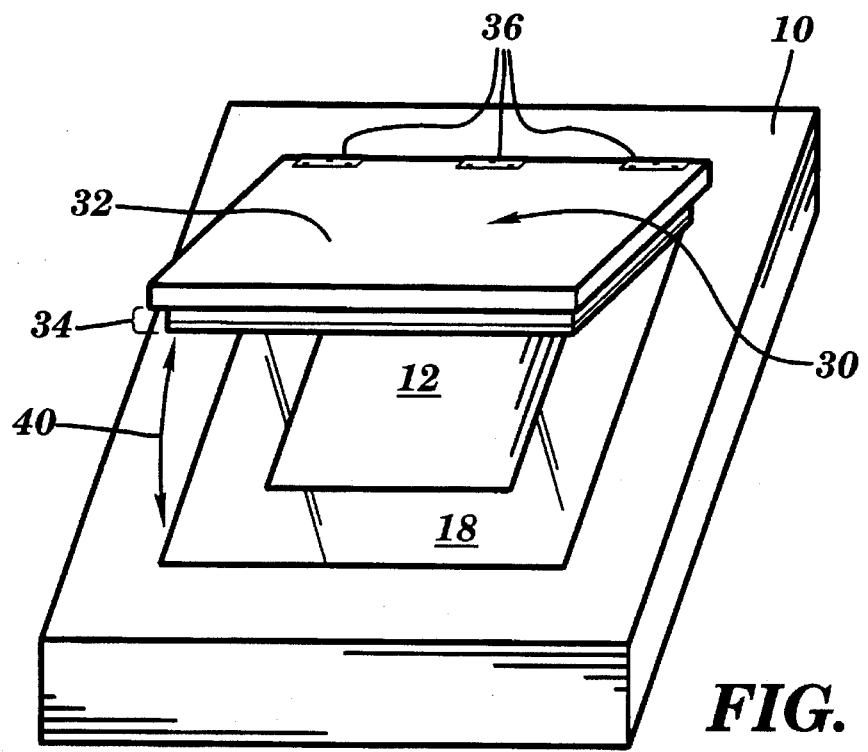
FIG. 3 illustrates the scanner cover of FIG. 2 in a partially raised position, with the individual cover components operating as a single unit.

FIG. 2 and FIG. 3 illustrate an embodiment of the invention wherein a screener cover assembly, generally designated as 30, is comprised of two cover components configured for use together as a single unit or separately to permit adjustment of an original 12 on the transparent scanning surface 18 without an unwanted shift in position. In FIG. 2, a screening system 10 has a scanner cover assembly 30 comprised of a rigid top cover component 32 and a second flexible cover component 34 mounted below it. The flexible cover component 34 is preferably formed of a flexible material such as rubber or the like. The cover components 32, 34 are mounted to the body of the scanning system 10 using hinge assembly 36 to allow the cover components to be displaced (i.e., opened or closed) together as a single unit, or separately as will be described below. For use as a single unit, the cover components 32, 34 are removably fixed together at one or more points along an interface surface 38.

Figure 7:
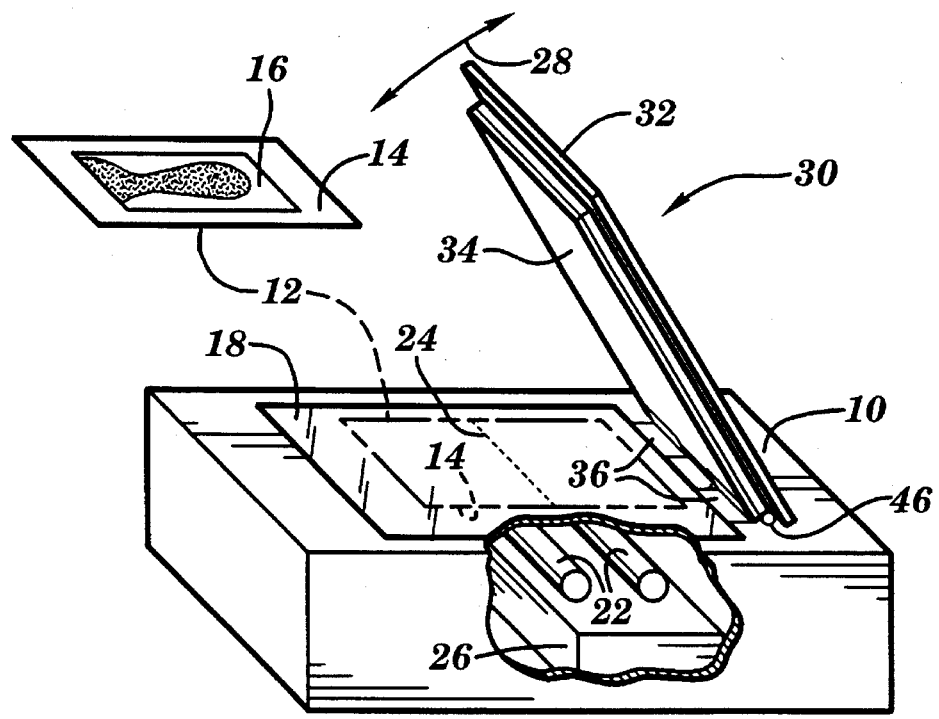
FIG. 7 illustrates a scanning system incorporating the improved scanner cover of the present invention.

FIG. 3 illustrates the scanner cover assembly 30 of the present invention in a partially raised position with the two cover components 32, 34 coupled together as a single unit which can be used mad manipulated (directional arrow 40) in a manner similar to that of the one-piece cover 20 of the prior art (FIG. 1). In FIG. 7, the cover assembly 30 of the present invention is used in conjunction with scanning system 10 (FIG. 1) in lieu of the conventional, one-piece cover 20.

Figure 4:
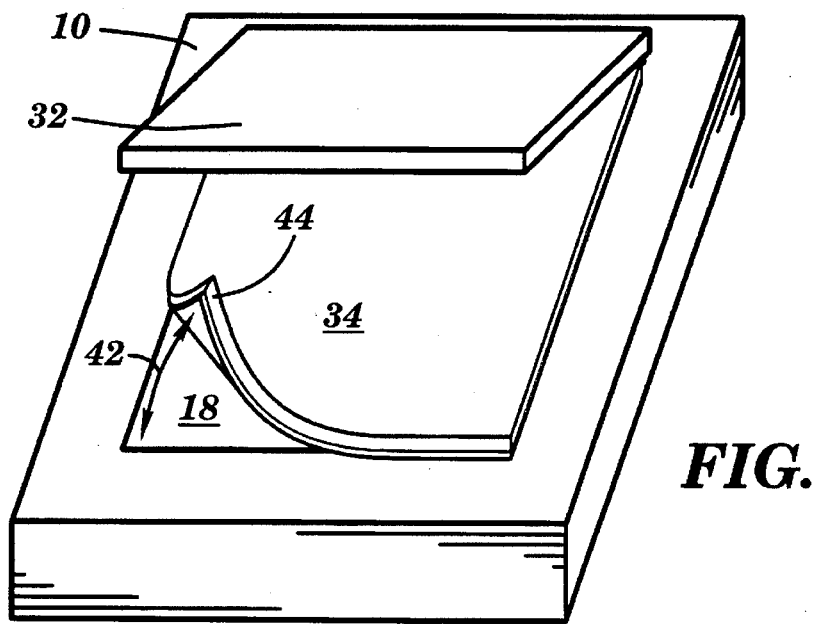
FIG. 4 shows the scanner cover of FIG. 2 in a partially raised position, with the individual cover components operating as separate independent units.

In FIG. 4, the scanner cover assembly 30 is shown with the two cover components 32, 34 uncoupled for independent use. In this example, the rigid top cover component 32 can be raised without lifting or otherwise displacing the lower flexible cover component 34, i.e., without disturbing or shifting original(s) 12 already positioned for scanning on the transparent scanning surface 18. The lower flexible cover component 34 can be bent back if desired (directional arrow 42), e.g., at corner 44, to place, reposition, view and/or remove original(s) 12, while at the same time preventing a shift in position of other original(s) 12' previously positioned on the transparent scanning surface 18 under the remaining, undisturbed sections of the lower flexible cover component 34. When the original(s) 12 are correctly positioned for scanning, the rigid top cover component 32 can be closed over the lower flexible cover component 34, thereby securely holding the original(s) to be scanned firmly against the transparent scanning surface 18.

Figure 5:
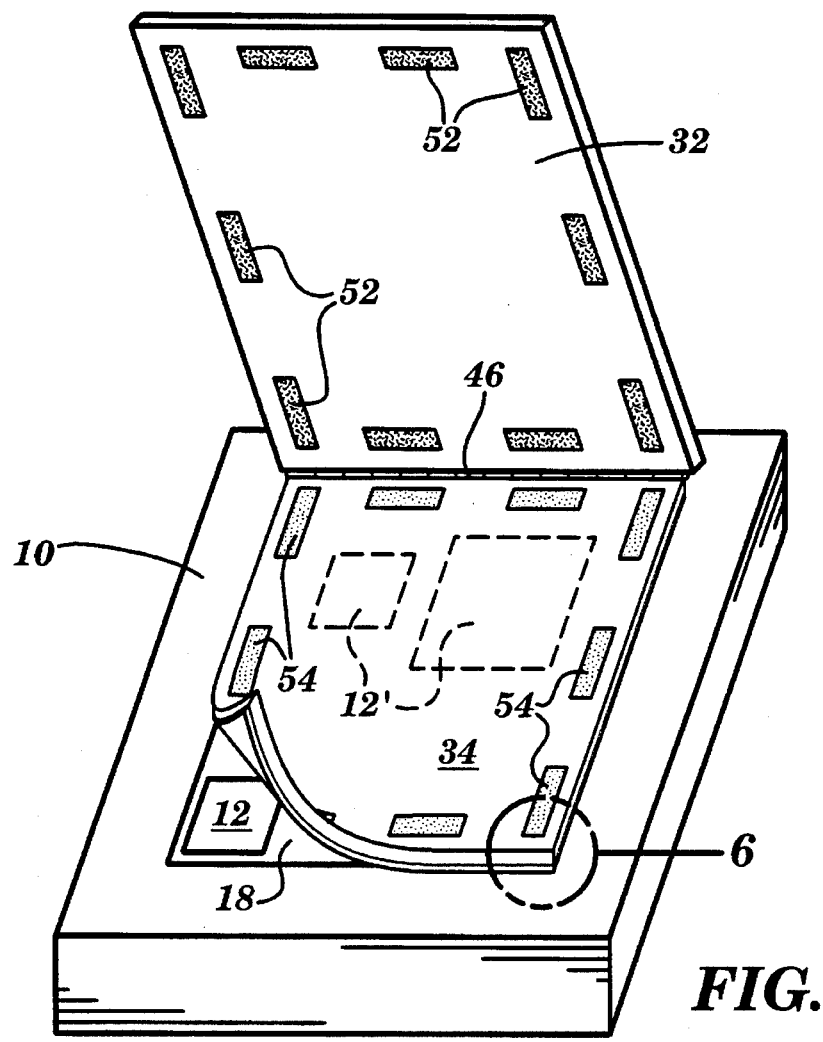
FIG. 5 provides a detailed view of a preferred embodiment of the scanner cover of the present invention.

FIG. 5 provides a detailed view of the scanner cover assembly 30 illustrating the cover components 32, 34 and a preferred method for removably coupling the cover components 32, 34 to form a single unit. In FIG. 5, the rigid top cover component 32 is shown in a raised position, separated from lower flexible cover component 34 and affixed thereto by a hinge member 46 (which can be combined with, or be independent of, the hinge assembly 36 (FIGS. 2, 3)).

Figure 6:
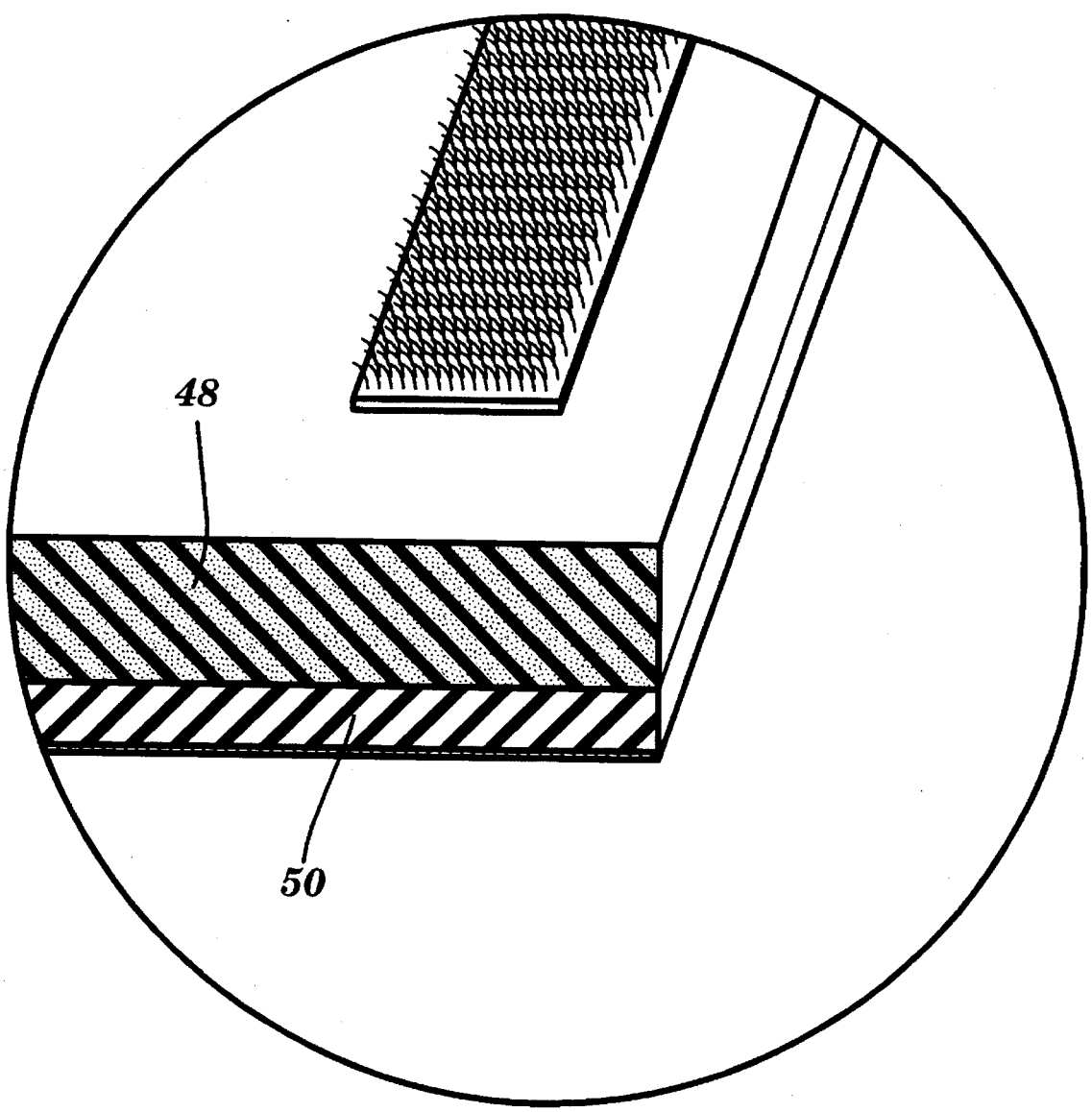
FIG. 6 is an enlarged view of a portion of FIG. 5.

The lower flexible cover component 34 is preferably formed from a flexible material having a thickness sufficient to retain the original(s) 12 in a flat state against the transparent scanning surface 18, and flexible enough to be bent back for viewing and positioning. As shown in FIG. 6, the flexible cover component 34 comprises, for example, an upper flexible foam layer 48 laminated to a layer of a flexible rubber-type material 50 having a downwardly facing surface coated with an optically reflective material. The cover components 32, 34 can be removably attached to each other using one or more complementary strips of hook 52 and loop 54 type materials. Of course, it should be clear to one skilled in the art that other methods can be used for the removable attachment of the cover components 32, 34 without departing from the scope of the present invention.

The foregoing description of the present invention has been presented for purposes of illustration and description. It is not intended to be exhaustive or to limit the invention to the precise form disclosed, and obviously many modifications and variations are possible in light of the above teaching. Such modifications and variations that may be apparent to a person skilled in the art are intended to be included within the scope of this invention as defined by the accompanying claims.

We claim:

1. A cover assembly for a scanning system comprising:

a first, substantially rigid cover component;

means for pivotally mounting said first, substantially rigid cover component to said scanning system, wherein said first substantially rigid cover component can be raised and lowered relative to a surface of said scanning system;

a second, substantially flexible cover component;

means for pivotally mounting said second, substantially flexible cover component to said scanning system, wherein said second, substantially flexible cover component can be raised and lowered relative to the surface of said scanning system independently of said first, substantially rigid cover component; and means for releasably coupling said second, substantially flexible cover component to an underside of said first, substantially rigid cover component, wherein said first and second cover components can be selectively raised and lowered as a unit or independently of one another;

said second, substantially flexible cover component including an upper layer formed of a foam-type material and a lower layer formed of a rubber-type material, wherein a downwardly facing surface of said lower layer is coated with an optically reflective material.

2. The cover assembly for a scanning system according to claim 1, wherein, when said first cover component is raised and said first and second cover components are uncoupled, said second cover component can be pulled off the surface of said scanning surface to selectively expose a portion of said surface.

\* \* \* \* \*